United States Patent
Ku et al.

(10) Patent No.: US 12,145,101 B2
(45) Date of Patent: Nov. 19, 2024

(54) SYSTEM AND METHOD FOR $CO_2$ CAPTURE FROM A FLEET OF $CO_2$ PRODUCING ASSETS

(71) Applicants: China Energy Investment Corporation Limited, Beijing (CN); National Institute of Clean-and-Low-Carbon Energy, Beijing (CN)

(72) Inventors: Anthony Ku, Mountain View, CA (US); Surinder Singh, Mountain View, CA (US); Pingjiao Hao, Mountain View, CA (US); Jeff Allen, Mountain View, CA (US)

(73) Assignees: China Energy Investment Corporation Limited, Beijing (CN); National Institute of Clean-And-Low-Carbon Energy, Beijing (CN)

( * ) Notice: Subject to any disclaimer, the term of this patent is extended or adjusted under 35 U.S.C. 154(b) by 532 days.

(21) Appl. No.: 17/421,516

(22) PCT Filed: Jan. 14, 2019

(86) PCT No.: PCT/CN2019/071610
§ 371 (c)(1),
(2) Date: Jul. 8, 2021

(87) PCT Pub. No.: WO2020/143068
PCT Pub. Date: Jul. 16, 2020

(65) Prior Publication Data
US 2022/0088534 A1 Mar. 24, 2022

(30) Foreign Application Priority Data
Jan. 10, 2019 (CN) .......................... 201910024698.3

(51) Int. Cl.
*B01D 53/78* (2006.01)
*B01D 53/14* (2006.01)
*B01D 53/22* (2006.01)

(52) U.S. Cl.
CPC ......... *B01D 53/78* (2013.01); *B01D 53/1475* (2013.01); *B01D 53/228* (2013.01);
(Continued)

(58) Field of Classification Search
None
See application file for complete search history.

(56) References Cited

U.S. PATENT DOCUMENTS

| | | |
|---|---|---|
| 7,164,883 B2 | 1/2007 | Rappaport et al. |
| 7,426,489 B2 | 9/2008 | van Soestbergen et al. |

(Continued)

FOREIGN PATENT DOCUMENTS

| | | | |
|---|---|---|---|
| CN | 101749949 A | 6/2010 | |
| CN | 102200057 A | 9/2011 | |

(Continued)

*Primary Examiner* — Jason M Greene
(74) *Attorney, Agent, or Firm* — Calfee, Halter & Griswold LLP

(57) ABSTRACT

The invention relates to a system and method for $CO_2$ capture. The system includes a fleet of $CO_2$ producing assets comprising a fleet of assets having at least two individual assets that produce $CO_2$ containing gas streams, and a set of modular $CO_2$ capture units to capture the $CO_2$ from the $CO_2$ containing gas streams produced by the fleet of assets, wherein at least one of the individual assets is equipped with not less than two modular $CO_2$ capture units, and at least one of the modular $CO_2$ capture units is operated at more than one of the assets during the service life of the modular $CO_2$ capture unit. The method for $CO_2$ capture includes providing the fleet of assets and equipping them with a set of modular $CO_2$ capture units. Advantage over current approaches is
(Continued)

performance is optimized across a fleet of assets rather than at an individual site.

16 Claims, 3 Drawing Sheets

(52) U.S. Cl.
CPC ...... *B01D 53/229* (2013.01); *B01D 2257/504* (2013.01); *B01D 2258/02* (2013.01)

(56) References Cited

U.S. PATENT DOCUMENTS

| | | |
|---|---|---|
| 7,440,871 B2 | 10/2008 | Mcconnell et al. |
| 7,489,990 B2 | 2/2009 | Fehr et al. |
| 8,321,234 B2 | 11/2012 | Ohnemus et al. |
| 2011/0288184 A1* | 11/2011 | Nardo ............... B01D 53/229 423/239.1 |
| 2012/0111192 A1* | 5/2012 | Nazarko ............ B01D 53/1475 96/7 |
| 2017/0014750 A1 | 1/2017 | Yoshikawa et al. |
| 2017/0043333 A1 | 2/2017 | Wright et al. |
| 2018/0369750 A1* | 12/2018 | Riley ................. B01D 53/1475 |

FOREIGN PATENT DOCUMENTS

| | | |
|---|---|---|
| CN | 102441319 A | 5/2012 |
| CN | 108472571 A | 8/2018 |

* cited by examiner

SYSTEM AND METHOD FOR CO₂ CAPTURE FROM A FLEET OF CO₂ PRODUCING ASSETS

CROSS REFERENCE TO RELATED APPLICATIONS

This application is a 35 USC § 371 National Stage application of International Patent Application No. PCT/CN2019/071610, which was filed Jan. 14, 2019, entitled "SYSTEM AND METHOD FOR CO₂ CAPTURE FROM A FLEET OF CO₂ PRODUCING ASSETS," and claims priority to Chinese Patent Application No. 201910024698.3, filed Jan. 10, 2019, all of which are incorporated herein by reference as if fully set forth.

FIELD OF THE INVENTION

The invention relates to $CO_2$ capture area, particularly relates to system and method for $CO_2$ capture from a fleet of $CO_2$ producing assets.

BACKGROUND OF THE INVENTION

The potential for climate change due to anthropogenic greenhouse gas emissions is a driver for interest in decarbonization of power generation and industrial processes. For this reason, the ability to capture $CO_2$ from exhaust gases is desirable. This general approach can be applied to thermal power plants fueled by coal, natural gas, or biomass, as well as industrial systems that generate exhaust gas streams that contain $CO_2$. The prior art includes numerous examples of $CO_2$ capture units optimized for coal-fired power plants, natural gas-fired power plants, and industrial sources. The prior art also describes modular $CO_2$ capture systems that comprise modules that are deployable as multiple discrete units that are customized for use at individual sites.

While there is prior art related to asset management related to infrastructure, for example U.S. Pat. No. 7,164,883B2, U.S. Pat. No. 7,489,990B2, the advantages of fleet-level optimization have not been appreciated for $CO_2$ capture. Prior art related to monitoring and monetizing $CO_2$ emissions through markets, for example U.S. Pat. No. 7,426,489B2, U.S. Pat. No. 7,440,871B2, U.S. Pat. No. 8,321,234B2 has focused on aggregating data for performance across a fleet of assets and identifying opportunities to improve overall system performance or profitability. These efforts to focus on optimizing overall system performance, allows for the possibility that individual assets may not be operated optimally at the individual level. However, this class of prior art does not anticipate active management of the $CO_2$ capture hardware, including their redistribution among assets in the fleet.

Prior art on modular $CO_2$ capture units focuses on individual module design, and ways to customize the performance for a given asset. It is not obvious that a modular capture unit be operated at a first local site in a manner that is less than optimal because of the potential for benefits in other assets within a fleet offsets the reduced performance at the first local site.

The prior art described above on asset management focuses on deployment and operation of individual assets, but does not consider the possibility that the modular $CO_2$ units can be redeployed to optimize system performance during the life cycle of the fleet (rather than individual assets or modular $CO_2$ units). While redeployment is widely considered in asset optimization of fleets with mobile assets, it is generally considered less plausible in situations with fixed assets.

SUMMARY OF THE INVENTION

The object of the present invention is providing a system and a method for $CO_2$ capture from a fleet of $CO_2$ producing assets, wherein the system and the method offers advantages over current approaches that only seek to optimize performance at an individual site, rather than across a fleet of assets.

Therefore, in one aspect, the present invention provides a system for $CO_2$ capture from a fleet of $CO_2$ producing assets, comprising:

a fleet of assets comprising at least two individual assets that produce $CO_2$ containing gas streams;

a set of modular $CO_2$ capture units to capture the $CO_2$ from the $CO_2$ containing gas streams produced by the fleet of assets;

wherein at least one of the individual assets is equipped with at not less than two modular $CO_2$ capture units, and at least one of the modular $CO_2$ capture units is operated at more than one of the assets during the service life of the modular $CO_2$ capture unit.

In another aspect, the present invention provides a method for $CO_2$ capture from a fleet of $CO_2$ producing assets, comprising:

(1) providing a fleet of assets comprising at least two individual assets that produce $CO_2$ containing gas streams;

(2) equipping the fleet of assets with a set of modular $CO_2$ capture units;

wherein at least one of the individual assets is equipped with not less than two modular $CO_2$ capture units, and at least one of the modular $CO_2$ capture units is operated at more than one of the assets during the service life of the modular $CO_2$ capture unit.

The system provided by the present invention includes a set of modular $CO_2$ capture units, deployed across a fleet of $CO_2$ producing fixed assets. For power plant applications that are very large scale, modular approaches offer benefits in flexibility and deployability. For example, relative to current practice involving the construction of large scale $CO_2$ capture systems custom-designed for high rates of $CO_2$ capture at large $CO_2$ sources such as power plants, modular $CO_2$ capture units can be deployed in a way that begins with lower initial capture rates, followed by the deployment of additional more modular $CO_2$ capture units at a later time to increase the effective capture rate. The system provided by the present invention can reduce the initial capital expenditure at the power plant to accommodate $CO_2$ capture, making it easier to finance the initial deployment of $CO_2$ capture systems. It also provides flexibility to accommodate the gradual development of the infrastructure to remove the captured $CO_2$. For example, it may be possible to initially remove captured $CO_2$ using trucks, and later to construct dedicated pipelines to remove $CO_2$ at higher volumes or from multiple sites. One advantage of this method is that it allows the sequential deployment of $CO_2$ capture and offtake infrastructure in a way that provides flexibility in design and lower overall costs.

Another advantage of the modular $CO_2$ capture units is that they can be deployed at one asset and then relocated to another $CO_2$ producing asset. This imparts overall flexibility for optimization of $CO_2$ emissions management and economic performance across the entire fleet of assets. For example, a $CO_2$ capture module could be deployed at one asset with limited remaining life. At the end of the life of the asset, the asset could be decommissioned and the $CO_2$ capture module could be relocated and used at another asset.

Another advantage of modular $CO_2$ capture units is engineering flexibility. Hybrid configurations can be implemented more effectively and flexibility using modular $CO_2$ capture units than with large custom systems at power plants. For example, modular $CO_2$ capture units can be deployed in one configuration that satisfies one set of performance characteristics initially at a power plant, and then reconfigured later in the life of the power plant to operate with a different set of performance requirements.

Other features and advantages of the present invention will be explained specifically in the following detailed description of the embodiments.

BRIEF DESCRIPTION OF DRAWINGS

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

Figure 1:
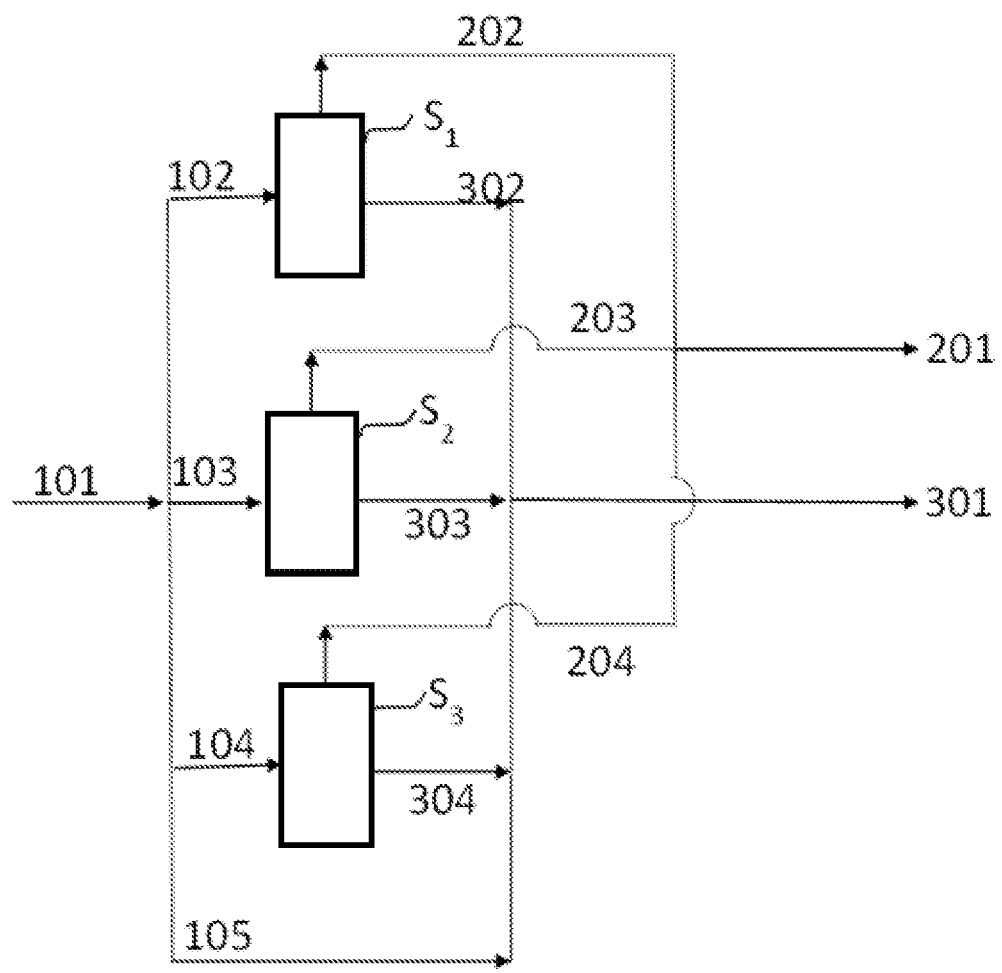
FIG. 1 is a schematic diagram of modular $CO_2$ capture units based on a solvent-based capture technology deployed at an asset.

REFERENCES IN THE DRAWINGS $S_1$, $S_2$, $S_3$ . . . $S_{11}$ respectively represent modular $CO_2$ capture units based on a solvent-based capture technology.

$M_1$ represents a modular $CO_2$ capture unit based on a membrane-based capture technology.

DETAILED DESCRIPTION OF THE EMBODIMENTS

Hereunder some embodiments of the present invention will be detailed. It should be appreciated that the embodiments described here are only provided to describe and explain the present invention, but shall not be deemed as constituting any limitation to the present invention.

The end points and any value in the ranges disclosed in the present invention are not limited to the exact ranges or values. Instead, those ranges or values shall be comprehended as encompassing values that are close to those ranges or values. For numeric ranges, the end points of the ranges, the end points of the ranges and the discrete point values, and the discrete point values can be combined to obtain one or more new numeric ranges, which shall be deemed as having been disclosed specifically in this document.

The first aspect of the present invention provides a system for $CO_2$ capture from a fleet of $CO_2$ producing assets, comprising:

a fleet of assets comprising at least two individual assets that produce $CO_2$ containing gas streams;

a set of modular $CO_2$ capture units to capture the $CO_2$ from the $CO_2$ containing gas streams produced by the fleet of assets;

wherein at least one of the individual assets is equipped with not less than two modular $CO_2$ capture units, and at least one of the modular $CO_2$ capture units is operated at more than one of the assets during the service life of the modular $CO_2$ capture unit.

The prior art on asset management focuses on deployment and operation of individual assets, but does not consider the possibility that the modular $CO_2$ units can be redeployed to optimize system performance during the life cycle of the fleet (rather than individual assets or modular $CO_2$ units). The system for $CO_2$ capture from a fleet of $CO_2$ producing assets has the following drawbacks: (1) Power generation and industrial point sources of $CO_2$ are all different, as a result, there is a need to "custom" capture systems to accommodate the unique aspects of each facility. This increases the cost of $CO_2$ capture. (2) Large-scale capture systems for removing $CO_2$ from flue gas at power plants have been designed with a high capture rate target in mind. The traditional installation of systems requires a fleet average adoption, as well as heavy initial capital investment. (3) The decommissioning of a power plant leaves a stranded asset in the capture system if it has not spanned its useful life.

For a fleet of assets comprising at least two individual assets that produce $CO_2$ containing gas streams, the present invention provides a system comprising a set of modular $CO_2$ capture units which offer benefits in flexibility and deployability, for example the set of modular $CO_2$ capture units can be used to achieve a lower initial capture rate, with the option to add more modules $CO_2$ capture units at a later time to increase the effective capture rate. In case of no special instructions, "modular" means the set of modular $CO_2$ capture units has flexibility in capture rate, size and scale of the unit in terms of how much $CO_2$ can be captured, and configuration strategy, and compatible with partial capture deployment. The set of modular $CO_2$ capture units is compatible with technology insertion and compatible with hybrid system concepts (e.g. a system comprising a sub-system based on membrane technology, followed by a sub-system based on solvent capture technology).

According to the present invention, the set of modular $CO_2$ capture units is redeployable which means a modular $CO_2$ capture unit can be redeployed from one asset to another, in a manner such that the total capital costs associated with redeploying a $CO_2$ capture unit is less than the total capital cost of stranding the $CO_2$ capture unit at the original asset combined with building a new $CO_2$ capture unit at the second asset site.

According to the present invention, wherein, the number and type of modular $CO_2$ capture units that the individual asset is equipped can be adjusted to take into account the operational situation at each asset to optimize $CO_2$ emissions and performance across the entire fleet of assets during the life cycle of each asset.

According to the present invention, at least one of the modular $CO_2$ capture units is operated at more than one of the assets during the service life of the modular $CO_2$ capture unit. In this manner that is more efficient, cost-effective and timely than constructing a new custom unit. According to a specific embodiment of the present invention, at least one of the modular $CO_2$ capture units is retrofitted to an asset, and upon decommissioning of the asset at the end of its service life, the modular $CO_2$ capture unit is redeployed at another asset. In this manner can maintain compliance with overall fleet $CO_2$ emissions targets.

The number of the modular $CO_2$ capture units that the individual asset is equipped can be adjusted based on the desired rate of $CO_2$ capture at the individual asset. Specifically, an asset can be equipped with modular $CO_2$ capture units to achieve one rate of $CO_2$ capture, and then modular $CO_2$ capture units can be added or removed to increase or decrease the rate of $CO_2$ capture at the individual asset. Modular $CO_2$ capture units at a site can be reconfigured to alter the capture rate of otherwise optimize performance of the $CO_2$ capture process. Modular $CO_2$ capture units can also be added or removed at a specific asset to achieve overall fleet-level $CO_2$ emissions intensity targets. For example, modular $CO_2$ capture units can be added to one or more assets in a fleet to increase the average $CO_2$ capture rate across the fleet and reduce its $CO_2$ emissions intensity. The addition of modular $CO_2$ capture units at a specific asset may or may not involve reconfiguration of the $CO_2$ capture system at that site. Examples of reconfiguration include, but are not limited to, adjusting the gas flow path through two selected modules in the $CO_2$ capture system from a series configuration to a parallel configuration, or vice versa.

According to the present invention, at least one of the individual assets is equipped with not less than two modular $CO_2$ capture units. The deployment of a single modular $CO_2$ capture unit at an asset can be used to achieve a lower initial capture rate, with the option to add more modular $CO_2$ capture units at a later time to increase the effective capture rate.

In one preferred embodiment, at least one of the individual assets is equipped with not less than two modular $CO_2$ capture units which are based on different capture technologies. For example, one of the individual assets is equipped with a hybrid modular configuration comprising one or more modules using a membrane-based capture technology followed by one or more modules using a solvent-based capture technology. In another embodiment, one or more modules using a membrane-based capture technology could be deployed at an asset at one point in time to achieve a low level of $CO_2$ capture rate (up to 60%), and one or more modules using a solvent-based capture technology could be deployed at a later time and the full set of modules could be configured to achieve a higher capture rate (greater than 60%) from the asset.

The present invention has no particularly limitation with regards to the individual assets in the fleet of assets. In the present invention, without particular limitation, the individual assets refer to any device capable of producing a $CO_2$ containing gas stream. The fleet of assets refers to a collection of any device capable of producing a $CO_2$ containing gas stream. In a preferred embodiment of the present invention, the fleet of assets comprises a fleet of power plants and/or industrial $CO_2$ source assets; further preferably, the fleet of assets comprises a fleet of power plants. Specifically, the fleet of power plants can comprise a thermal power plant fueled by coal, natural gas, biomass, or a combination thereof.

In one embodiment, the fleet of assets can comprise a combination of fossil fuel-powered generation along with non-fossil generation such as nuclear, wind, solar, hydroelectric, or geothermal-powered generation. In this embodiment, the modular $CO_2$ capture units would be deployed exclusively at the fossil fuel-powered assets, but the non-fossil generation would impact the deployment strategy of the modular $CO_2$ capture units to achieve optimal performance across the entire fleet.

According to the present invention, the system can further comprise monitoring/tracking sub-systems on the modules that monitor/track the performance and life of the modular $CO_2$ capture units. The data generated by the monitoring and tracking sub-systems is used to determine adjustments in the configuration of the overall system (i.e., the deployment situation of modules, and their transfer from one site to another over time).

The present invention offers advantages over the prior art in flexibility and life-cycle performance of $CO_2$ capture across a fleet of assets, including the ability to customize the modular $CO_2$ capture unit configuration at individual assets, increase or decrease the capture rate at different assets during the life of the asset, redeploy modular $CO_2$ capture units from one asset to another to improve overall performance across the fleet, and maintain or upgrade the modular $CO_2$ capture unit performance through the replacement of individual modular $CO_2$ capture units at specific assets. Current practices of designing $CO_2$ capture units that are customized to a particular asset offer similar performance potential at the time of installation lack the advantages of flexibility in operation, redeployability, maintenance and upgrading that are offered by the present invention. Current practice of using modules offers flexibility, but the systematic deployment across a fleet of assets, with the option of redeploying or reconfiguring module capture systems to achieve fleet-level rather and site-specific optimization of performance has not been considered for $CO_2$ emissions control. The system for $CO_2$ capture comprising a set of modular $CO_2$ capture units which offers benefits in flexibility and deployability.

In another aspect, the present invention provides a method for $CO_2$ capture from a fleet of $CO_2$ producing assets, comprising:

(1) providing a fleet of assets comprising at least two individual assets that produce $CO_2$ containing gas streams;

(2) equipping the fleet of assets with a set of modular $CO_2$ capture units;

wherein at least one of the individual assets is equipped with not less than two modular $CO_2$ capture units, and at least one of the modular $CO_2$ capture units is operated at more than one of the assets during the service life of the modular $CO_2$ capture unit.

According to the method provided by the present invention, in case of no special instructions, "modular" means the set of modular $CO_2$ capture units has flexibility in capture rate, size and scale of the unit in terms of how much $CO_2$ can be captured, and configuration strategy, and compatible with partial capture deployment. The set of modular $CO_2$ capture units is compatible with technology insertion and compatible with hybrid system concepts (e.g. a system comprising a sub-system based on membrane technology, followed by a sub-system based on solvent capture technology).

According to the method provided by the present invention, the set of modular $CO_2$ capture units is redeployable which means a modular $CO_2$ capture unit can be redeployed from one asset to another, in a manner such that the total capital costs associated with relocating a $CO_2$ capture unit is less than the total capital cost of stranding the $CO_2$ capture unit at the original asset combined with building a new $CO_2$ capture unit at the second asset site. Alternately, modular $CO_2$ capture units can be easily maintained through the replacement of modular $CO_2$ capture units that require maintenance or have reached the end of their service life. In addition, modular $CO_2$ capture units replacement can be used to upgrade existing systems in a more flexible manner, allowing for more ready "technology insertion" as more advanced systems become available. Redeployability also offers advantages in the life cycle cost of modular $CO_2$ capture unit. In cases where modular $CO_2$ capture unit are retrofitted to existing $CO_2$-emitting assets, the asset may reach the end of its service life before the modular $CO_2$ capture unit reaches the end of its service life. The capital costs savings do not necessarily have to be linear; in some cases, the savings from redeploying a module may not be the full cost of the module.

The present invention has no particularly limit to the size (e.g., tons per day capacity) of the modular $CO_2$ capture unit, and the size of the different modular $CO_2$ capture units differ.

Although the number of the individual assets in the fleet is at least two, there is no special restriction on the number of the individual assets, Those skilled in the art can make appropriate selection according to the specific conditions of the plant. The key aspect of the invention is the use of the set of modular $CO_2$ capture units for capturing $CO_2$ across a fleet of assets, the prior art in $CO_2$ capture systems has focused on developing modules for greenfield use, customized to individual asset.

According to the method provided by the present invention, preferably, at least one of the individual assets is equipped with not less than two modular $CO_2$ capture units which are based on different capture technologies, further preferably, the different capture technologies comprise solvent-based capture technologies, membrane-based capture technologies, sorbent-based capture technologies, cryogenics-based capture technologies, or combinations thereof. Different capture technologies have different capture performance, the number and type of modular $CO_2$ capture units that the individual asset is equipped can be adjusted to take into account the operational situation at each asset to optimize $CO_2$ emissions and performance across the entire fleet of assets during the life cycle of each asset. The specific implementation of different capture technologies may be performed according to conventional techniques in the art, and the present invention is not particularly limited thereto.

According to the present invention, the modular $CO_2$ capture units can be configured in one way to achieve a lower rate of $CO_2$ capture rate and configured in a different way to achieve a higher rate of $CO_2$ capture. Those skilled in the art can design specific configurations in which module capture units (parallel trains of the same type of capture technology, hybrid configurations with parallel and/or series trains of multiple types of capture technologies) are deployed at an individual asset according to the specific conditions of the plant.

The present invention is exemplified using the following five capture cases: Case A. Modular membrane technology only; Case B. Modular solvent technology only; Case C. Modular membrane technology in series with a modular solvent technology with the retentate from the membrane module routed to the solvent modules; Case D. Modular membrane technology in series with a modular solvent technology with the permeate routed to the solvent modules; Case E. A comparative case with a modular membrane technology and the retentate routed to a large non-modular solvent system. Case C offers superior performance over Case A, Case B, Case D, and Case E at high levels of $CO_2$ capture rate and Case D offers superior performance over Case A, Case B, Case C, and Case E at low levels of $CO_2$ capture rate. This illustrates the value of the modular approach vs. a large installation approach, as well as the value of flexibility obtained in setting up Case D for low capture rate early in the life of a retrofit asset, and then expanding the capture rate later and improving the performance over a larger Case D by switching to a Case C configuration.

According to the method provided by the present invention, preferably, the modular $CO_2$ capture unit deployed at an asset operated at a low level of $CO_2$ capture rate is based on a solvent-based capture technology or a membrane-based capture technology; the modular $CO_2$ capture units deployed at an asset operating at a high level of $CO_2$ capture rate comprising a modular $CO_2$ capture unit based on a membrane-based capture technology followed by modular $CO_2$ capture units based on solvent-based capture technologies.

According to the present invention, preferably, the low level of $CO_2$ capture rate is not higher than 50%, the high level of $CO_2$ capture rate is not less than 70%, more preferably, the low level of $CO_2$ capture rate is not higher than 30%, the high level of $CO_2$ capture rate is not less than 90%. According to the present invention, in case of no special instructions, the capture rate refers to the fraction of $CO_2$ captured by the modular $CO_2$ capture unit divided by the total $CO_2$ exhausted to the atmosphere by the asset.

According to the method provided by the present invention, at least one of the modular $CO_2$ capture units is operated at more than one of the assets during the service life of the modular $CO_2$ capture unit. In this manner that is more efficient, cost-effective and timely than constructing a new custom unit.

According to the present invention, preferably, at least one of the modular $CO_2$ capture units is retrofitted to an asset, and upon decommissioning of the asset at the end of its service life, the modular $CO_2$ capture unit is redeployed at another asset. In this manner can maintain compliance with overall fleet $CO_2$ emissions targets.

According to the present invention, preferably, modular $CO_2$ capture units are retrofitted to an asset to achieve one level of $CO_2$ capture rate, and modular $CO_2$ capture units are added or removed to increase or decrease the rate of $CO_2$ capture at the individual asset. The modular $CO_2$ capture units can be added or removed in response to overall fleet $CO_2$ emissions targets. The number of the modular $CO_2$ capture units that the individual asset is equipped can be adjusted based on the desired rate of $CO_2$ capture at the individual asset.

According to the present invention, preferably, modular $CO_2$ capture units are retrofitted to an asset to achieve one level of capture rate, and modular $CO_2$ capture units are added and reconfigured to optimize performance at a different $CO_2$ capture rate. For example, modular $CO_2$ capture units can be installed across multiple assets in a fleet to achieve an initial fleet-average $CO_2$ emission intensity. The number of modular $CO_2$ capture units can be increased to reduce the fleet-average $CO_2$ emission intensity. The choice of which assets the additional modular $CO_2$ capture units are deployed at and the local configuration of all modules at a given site can be determined to optimize the overall performance and cost across the fleet of assets. The different configuration options at a given asset can be determined by one skilled in the art.

According to the present invention, preferably, the method further comprising replacing a modular $CO_2$ capture unit with another modular $CO_2$ capture unit with equal or superior performance at some point during the life of the asset. When the individual asset's capture rate requirement for the modular $CO_2$ capture unit changes, the modular $CO_2$ capture unit can be replaced by another modular $CO_2$ capture unit with equal or superior performance.

According to the method provided by the present invention, the fleet of assets is as described above, no more details here.

According to the present invention, the method can further comprise sub-systems that monitor or otherwise track the performance and life of the modular $CO_2$ capture units. Adjustments to the configuration of the modular $CO_2$ capture units can be made based on the data from the monitoring and tracking sub-system.

The method provided by the present invention offer benefits in flexibility and deployability for power plant applications that are very large scale. This reduces the initial capital expenditure and financing requirements at the power plant to accommodate $CO_2$ capture. It also provides flexibility to accommodate the development of offtake options to remove the captured $CO_2$. For example, modular $CO_2$ capture units can be deployed in a way that begins with lower initial capture rates, followed by the deployment of additional more modular $CO_2$ capture units at a later time to increase the effective capture rate. It also provides flexibility to accommodate the gradual development of the infrastructure to remove the captured $CO_2$. For example, it may be possible to initially remove captured $CO_2$ using trucks, and later to construct dedicated pipelines to remove $CO_2$ at higher volumes or from multiple sites. One advantage of this method is that it allows the sequential deployment of $CO_2$ capture and offtake infrastructure in a way that provides flexibility in design and lower overall costs. Current practice of deploying customized systems at large scale may not be as flexible as the method provided by the present invention in accommodating a transition in target capture rate during the life of a power plant asset.

The present invention will be described in detail below.

Example 1

Figure 2:
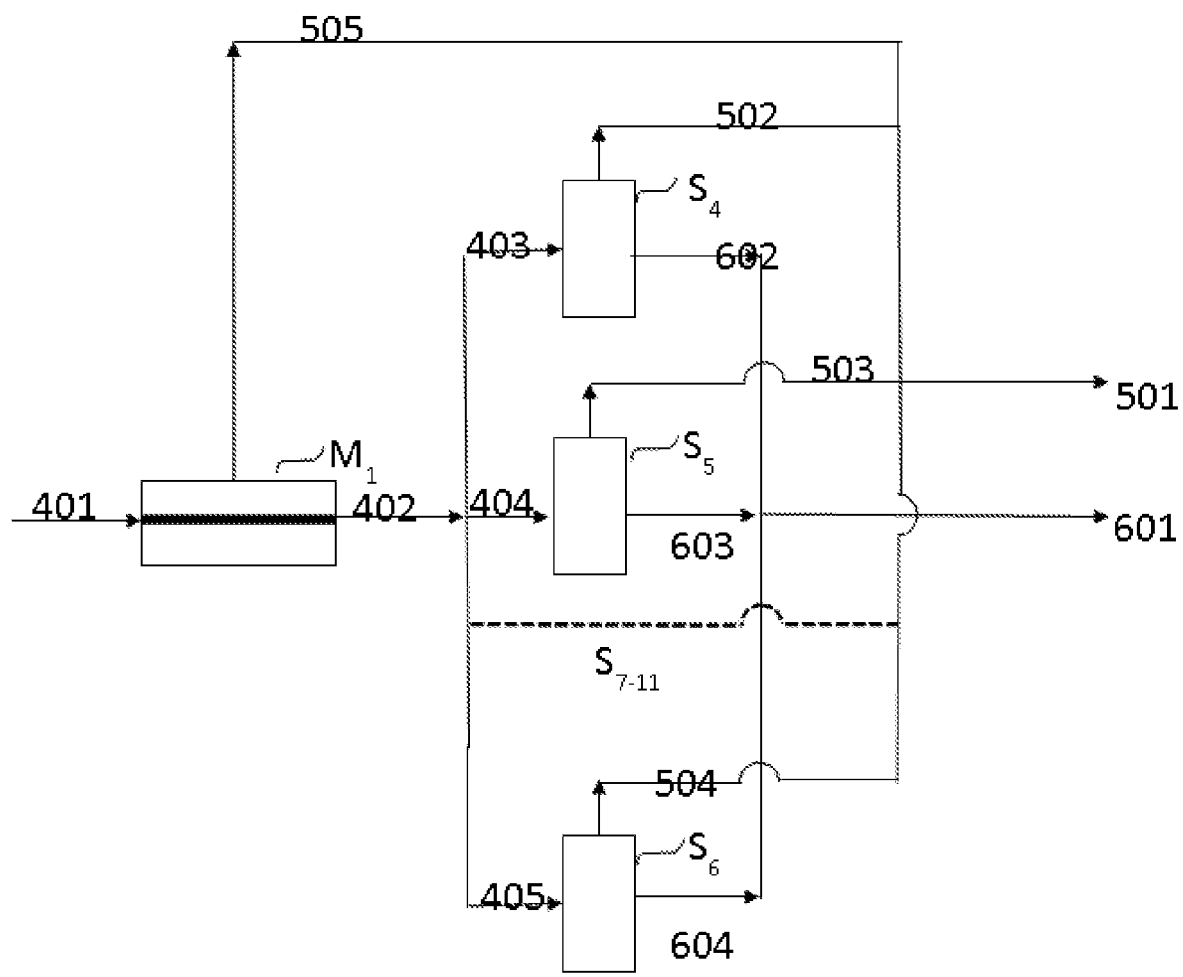
FIG. 2 is a schematic diagram of a modular $CO_2$ capture unit based on a membrane-based capture technology followed by modular $CO_2$ capture units based on solvent-based capture technologies deployed at an asset.

The system provided by the present invention offers flexibility over the prior art. For example, flexibility can be gained by deploying fewer numbers of small solvent modules (modular $CO_2$ capture unit based on solvent-based capture technologies) for lower capture rates with the addition of modules for higher capture rates later in time. This reduces the initial capital and financing requirements. Specifically, a low capture rate of 30% could be achieved at an asset by deploying 3 identical modules (based on solvent technology) capable of 100% capture on 10% of the total flow each (shown as FIG. 1, mass balance shown in table 1). A high capture rate could be achieved by deploying 1 membrane module operating on 100% of the exhaust gas to capture a small fraction of the $CO_2$ in a permeate stream, with the retentate routed to 8 identical modules (based on solvent technology) that capture sufficient $CO_2$ to achieve a total capture rate of 90% at the asset (shown as FIG. 2, mass balance shown in table 2).

For flue gas from a coal-fired power plant, the combined $CO_2$ product stream can meet the $CO_2$ purity specification of <4% $N_2$ using a single stage membrane system with a $CO_2/N_2$ selectivity of about 15. Such a configuration could also result in a lower overall energy requirement relative to a reference case using only solvent to capture the $CO_2$. In the specific example, a 5% energy savings is achieved.

TABLE 1

Mass balance of $CO_2$ in capture rate 30% using three identical modular solvent systems

| Stream Number | $CO_2$ Mass flowrate (arbitrary unit) |
| --- | --- |
| 101 | 100 |
| 102 | 11.11 |
| 103 | 11.11 |
| 104 | 11.11 |
| 105 | 66.67 |
| 201 | 30 |
| 202 | 10 |
| 203 | 10 |
| 204 | 10 |
| 301 | 70 |
| 302 | 1.11 |
| 303 | 1.11 |
| 304 | 1.11 |

TABLE 2

Mass balance of $CO_2$ in capture rate 90% using hybrid membrane and modular solvent systems

| Stream Number | $CO_2$ Mass flowrate (arbitrary unit) |
| --- | --- |
| 401 | 100 |
| 402 | 90 |
| 403 | 11.25 |
| 404 | 11.25 |
| 405 | 11.25 |
| 502 | 10 |
| 503 | 10 |
| 504 | 10 |
| 505 | 10 |
| 501 | 90 |
| 601 | 10 |
| 602 | 1.25 |
| 603 | 1.25 |
| 604 | 1.25 |

Example 2

Figure 3:
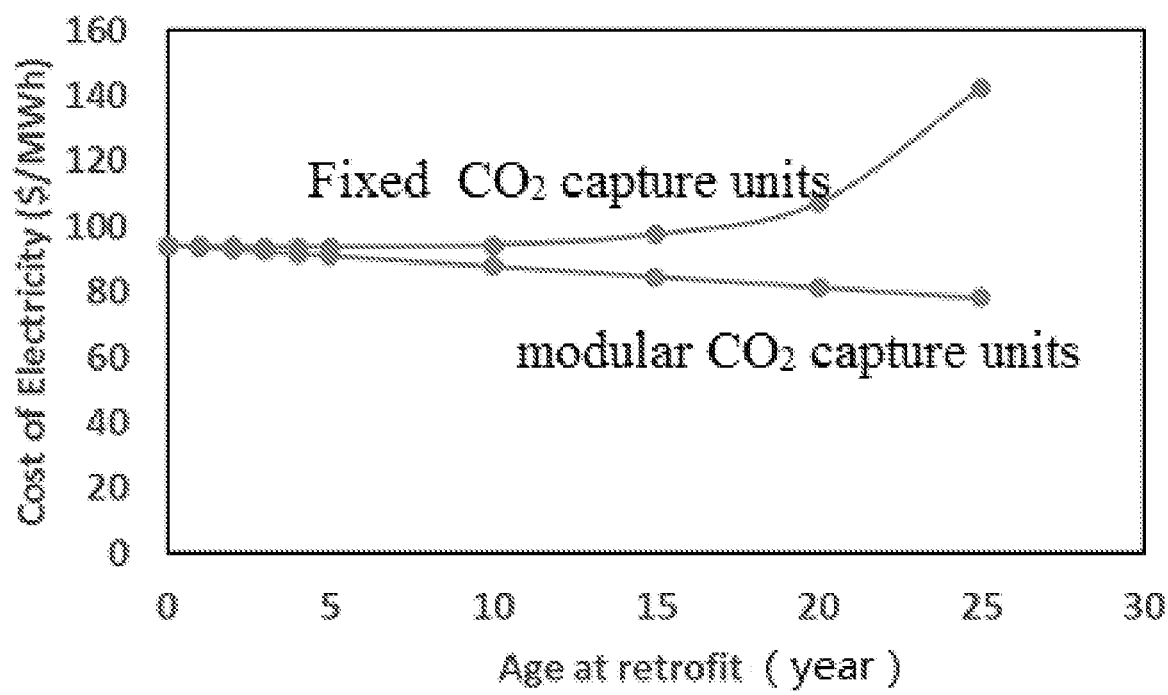
FIG. 3 is a curve that shows the effect of plant age on the cost of electricity.

The present invention also offers advantages through the ability to redeploy the modular $CO_2$ capture units. Fixed costs increase with plant age at retrofit because the $CO_2$ capture units capex must be financed over the remaining life of the plant (Reference: Singh et al. "China baseline coal-fired power plant with post-combustion $CO_2$ capture: 2. Techno-economics." International Journal of Greenhouse Gas Control 78 (2018): 429-436.). The effect of plant age is shown in FIG. 3 (Note CF at 57% for above updated figure, wherein CF means capacity factor which is the amount of electricity a power plant produces in a year divided by the total amount of electricity the same power plant is capable of producing in a year).

A modular $CO_2$ capture unit deployed at a given asset that is near the end of its service life could be redeployed to another asset. This decouples the financing of the modular $CO_2$ capture units from the remaining service life of the asset. The net benefit is a lower cost associated with $CO_2$ capture and improvements in the costs of achieving overall $CO_2$ emissions intensity targets across a fleet of assets.

Comparative Example 1

Optimization of the fleet-averaged $CO_2$ emissions intensity across a fleet of assets can be achieved using approaches known in the prior art. For example, it is possible to deploy $CO_2$ capture at the assets where the situation is most favorable, while deferring $CO_2$ capture at less favorable assets. A case can be considered with 2 power plant assets, where the average $CO_2$ capture rate is 45%, and the $CO_2$ capture is implemented at both assets at a rate of 45% at each asset. If one of the power plants has a significantly higher cost of $CO_2$ capture (due to less favorable factors such as higher fuel costs, lower efficiency turbine technology, smaller scale, further distance to $CO_2$ sinks, dry cooling, lower capacity factor, or other factors related to operations or hardware) then it would be more cost effective to implement a higher rate of $CO_2$ capture at the lower cost plant. In an extreme case, it may be advantageous to implement 90% capture at the lower cost plant and no $CO_2$ capture at the higher cost plant, modular $CO_2$ capture units make this operation possible. In situations where some of the assets with favorable situations have shorter remaining service life, the approach in this comparative example lacks the ability to achieve the level of performance and cost savings possible in the present invention. Moreover, the approach in this comparative example also has the drawback of "lock-in" where once a $CO_2$ capture system has been deployed at an asset, it is difficult to change the situation without incurring a cost. This limitation is overcome by the present invention.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the protected scope of the present invention.

In addition, it should be appreciated that the technical features described in the above embodiments can be combined in any appropriate manner, provided that there is no conflict among the technical features in the combination. To avoid unnecessary iteration, such possible combinations are not described here in the present invention.

Moreover, different embodiments of the present invention can be combined freely as required, as long as the combinations do not deviate from the spirit of the present invention. However, such combinations shall also be deemed as falling into the scope disclosed in the present invention.

The invention claimed is:

1. A system for $CO_2$ capture from a fleet of $CO_2$ producing assets, comprising:
   a fleet of assets comprising at least two individual assets that produce $CO_2$ containing gas streams;
   a set of modular $CO_2$ capture units to capture the $CO_2$ from the $CO_2$ containing gas streams produced by the fleet of assets;
   wherein the fleet of assets comprises a fleet of power plants; and
   wherein at least one of the individual assets is equipped with not less than two modular $CO_2$ capture units, and at least one of the modular $CO_2$ capture units is operated at more than one of the assets during the service life of the modular $CO_2$ capture unit,
   wherein the system further comprises a monitoring/tracking sub-system on the modular $CO_2$ capture units that monitor/track the performance and life of the modular $CO_2$ capture units.

2. The system according to claim 1, wherein at least one of the individual assets is equipped with not less than two modular $CO_2$ capture units which are based on different capture technologies.

3. The system according to claim 1, wherein the fleet of power plants comprises industrial $CO_2$ source assets.

4. A method for $CO_2$ capture from a fleet of $CO_2$ producing assets, comprising:
   (1) providing a fleet of assets comprising at least two individual assets that produce $CO_2$ containing gas streams;
   (2) equipping the fleet of assets with a set of modular $CO_2$ capture units;
   wherein the fleet of assets comprises a fleet of power plants; and
   wherein at least one of the individual assets is equipped with not less than two modular $CO_2$ capture units, and at least one of the modular $CO_2$ capture units is operated at more than one of the assets during the service life of the modular $CO_2$ capture unit,
   wherein the method further comprises providing a monitoring/tracking sub-system on the modular $CO_2$ capture units that monitor/track the performance and life of the modular $CO_2$ capture units.

5. The method according to claim 4, wherein at least one of the individual assets is equipped with not less than two modular $CO_2$ capture units which are based on different capture technologies.

6. The method according to claim 5, wherein the different capture technologies comprise solvent-based capture technologies, membrane-based capture technologies, sorbent-based capture technologies, cryogenics-based capture technologies, or combinations thereof.

7. The method according to claim 6, wherein the modular $CO_2$ capture unit deployed at an asset operated at a low level of $CO_2$ capture rate is based on a solvent-based capture technology or a membrane-based capture technology; the modular $CO_2$ capture units deployed at an asset operating at a high level of $CO_2$ capture rate comprising a modular $CO_2$ capture unit based on a membrane-based capture technology followed by modular $CO_2$ capture units based on solvent-based capture technologies.

8. The method according to claim 7, wherein the low level of $CO_2$ capture rate is not higher than 50%, and the high level of $CO_2$ capture rate is not less than 70%.

9. The method according to claim 4, wherein at least one of the modular $CO_2$ capture units is retrofitted to an asset, and upon decommissioning of the asset at the end of its service life, the modular $CO_2$ capture unit is redeployed at another asset.

10. The method according to claim 4, wherein modular $CO_2$ capture units are retrofitted to an asset to achieve one level of $CO_2$ capture rate, and modular $CO_2$ capture units are added or removed to increase or decrease the rate of $CO_2$ capture at the individual asset.

11. The method according to claim 4, wherein modular $CO_2$ capture units are retrofitted to an asset to achieve one level of $CO_2$ capture rate, and modular $CO_2$ capture units are added and reconfigured to optimize performance at a different $CO_2$ capture rate.

12. The method according to claim 4, wherein the fleet of power plants comprises industrial $CO_2$ source assets.

13. The method according to claim 4, further comprising replacing a modular $CO_2$ capture unit with another modular $CO_2$ capture unit with equal or superior performance at some point during the life of the asset.

14. The system according to claim 3, wherein the fleet of power plants comprises a thermal power plant fueled by coal, natural gas, biomass, or a combination thereof.

15. The method according to claim 8, wherein the low level of $CO_2$ capture rate is not higher than 30%, and the high level of $CO_2$ capture rate is not less than 90%.

16. The method according to claim 12, wherein the fleet of power plants comprises a thermal power plant fueled by coal, natural gas, biomass, or a combination thereof.

* * * * *